(12) United States Patent
Hutsell et al.

(10) Patent No.: US 7,827,425 B2
(45) Date of Patent: Nov. 2, 2010

(54) METHOD AND APPARATUS TO DYNAMICALLY ADJUST RESOURCE POWER USAGE IN A DISTRIBUTED SYSTEM

(75) Inventors: Steven R. Hutsell, Banks, OR (US); Krishnakanth Sistla, Hillsboro, OR (US); Yen-cheng Liu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1143 days.

(21) Appl. No.: 11/479,009

(22) Filed: Jun. 29, 2006

(65) Prior Publication Data

US 2008/0002603 A1    Jan. 3, 2008

(51) Int. Cl.
G06F 1/32    (2006.01)

(52) U.S. Cl. ............................. 713/323; 710/18; 713/320

(58) Field of Classification Search .................. 713/300, 713/320, 323; 710/18
See application file for complete search history.

(56) References Cited

U.S. PATENT DOCUMENTS

| | | | |
|---|---|---|---|
| 5,432,918 A | 7/1995 | Stamm | |
| 5,809,536 A | 9/1998 | Young et al. | |
| 5,870,616 A | 2/1999 | Loper et al. | |
| 5,875,472 A | 2/1999 | Bauman et al. | |
| 6,009,488 A | 12/1999 | Kavipurapu | |
| 6,038,673 A | 3/2000 | Benn et al. | |
| 6,327,606 B1 | 12/2001 | Chidambaran | |
| 6,804,761 B1 | 10/2004 | Chen et al. | |
| 7,007,176 B2 | 2/2006 | Goodfellow et al. | |
| 7,043,650 B2 | 5/2006 | Bresniker et al. | |
| 7,249,381 B2 * | 7/2007 | Telesco ........................ | 726/27 |
| 7,325,050 B2 * | 1/2008 | O'Connor et al. ........... | 709/223 |
| 2003/0055969 A1 * | 3/2003 | Begun et al. ................. | 709/226 |
| 2003/0084359 A1 | 5/2003 | Bresniker et al. | |
| 2005/0262505 A1 | 11/2005 | Esfahany et al. | |
| 2007/0079072 A1 | 4/2007 | Collier et al. | |
| 2007/0233932 A1 | 10/2007 | Collier et al. | |
| 2008/0002603 A1 | 1/2008 | Hutsell | |
| 2008/0005596 A1 | 1/2008 | Sistla | |
| 2008/0126707 A1 | 5/2008 | Sistla | |
| 2008/0126750 A1 | 5/2008 | Sistla | |

OTHER PUBLICATIONS

HyperTransport Link Specification, Revision 2.00b, Apr. 27, 2005.*
PCT Internal Search Report and Written Opinion, International application No. PCT/US2007/072294 mailed Oct. 30, 2007.
U.S. Appl. No. 11/479,438 entitled, "Method and Apparatus for Dynamically Controlling Power Management in a Distributed System" Sistla et al., filed Jun. 29, 2006.

(Continued)

*Primary Examiner*—Albert Wang
(74) *Attorney, Agent, or Firm*—Blakely, Sokoloff, Taylor & Zafman LLP

(57) ABSTRACT

A system and method to provide source controlled dynamic power management. An activity detector in a source determines expected future resource usage. Based on that expected usage, the source generates a power management command and sends that command to a destination. The destination then adjusts the power level of the resource based in the command.

21 Claims, 3 Drawing Sheets

OTHER PUBLICATIONS

U.S. Appl. No. 11/479,438, Notice of Allowance mailed Aug. 20, 2009.
U.S. Appl. No. 11/605,636 Office Action mailed Apr. 2, 2009.
U.S. Appl. No. 11/479,438 Office Action mailed Feb. 20, 2009.
U.S. Appl. No. 11/606,347, Office Action mailed Jan. 27, 2009.
U.S. Appl. No. 11/606,347, Final Office Action mailed Jul. 27, 2009.
PCT International Search Report and Written Opinion, International application No. PCT/US2007/072294, mailed Oct. 30, 2007.

* cited by examiner

METHOD AND APPARATUS TO DYNAMICALLY ADJUST RESOURCE POWER USAGE IN A DISTRIBUTED SYSTEM

BACKGROUND OF THE INVENTION

1. Field

Embodiments of the invention relate to power management. More specifically, embodiments relate to source controlled dynamic power management.

2. Background

Microprocessors commonly use dynamic power management techniques to manage power usage. Normally, dynamic power management for microprocessors is accomplished through activity detector circuitry that is located in the microprocessor and coupled to a centralized, front side bus (FSB). The activity detector circuitry is adapted to detect conditions under which certain units should be turned on or off and to adjust the power levels of these units appropriately.

Traditionally, the activity detector circuitry has provided acceptable performance because such circuitry was physically separated from the power-controlled units by only a short distance. However, bus architectures are moving away from FSB architectures and are beginning to utilize point-to-point architectures. One type of point-to-point architecture is referred to as "Common System Interconnect" or "CSI". This architecture will likely experience difficulties in power management.

One reason for experiencing such difficulties is that CSI-style distributed systems support implementations where the power management circuitry and the power-controlled units are placed on different integrated circuits, but are connected by CSI links. As a result, conventional activity detector circuitry cannot effectively hide the latency to turn on/off the units from the performance aspects of the system since it cannot provide adequate lead time to circuitry of these units to turn power on or off.

BRIEF DESCRIPTION OF DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
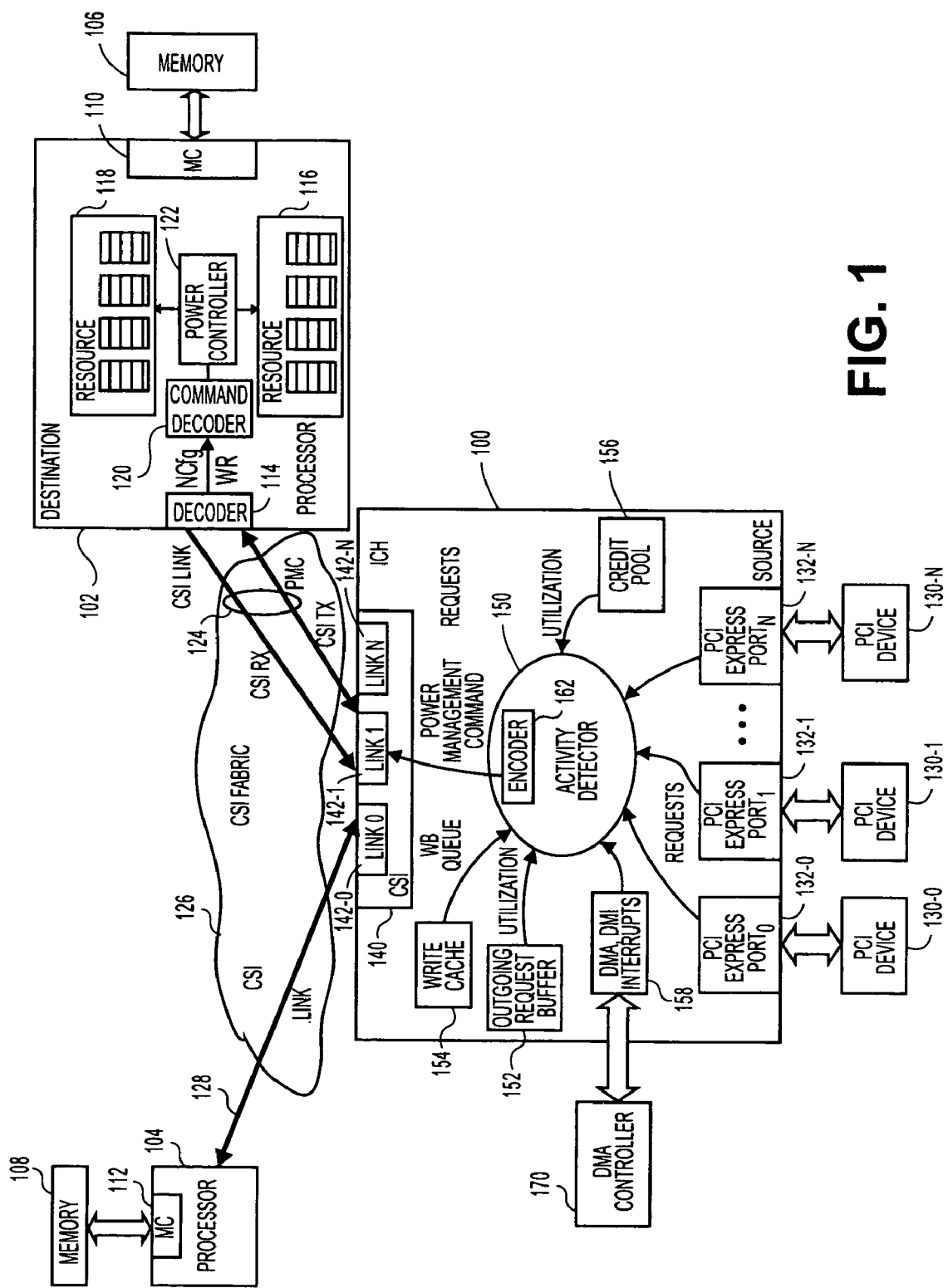
FIG. 1 is a block diagram of a dual processor system of one embodiment of the invention.

FIG. 1 is a block diagram of a dual processor system of one embodiment of the invention. Such a dual processor (DP) embodiment and may occur in a variety of possible platforms. For example, this embodiment may be implemented as a desk top or mobile computer, a server, a set top box, a personal digital assistant (PDA), an alphanumeric pager, cellular telephone, or any other type of wireless communication device.

In this embodiment, two destinations (processor 102 and processor 104) are communicatively coupled to a source. In this example, input/output hub (IOH) 100 by point-to-point links 124, 128. A "link" is generally defined as an information-carrying medium that establishes a communication pathway for messages, namely information placed in a predetermined format. The link may be a wired physical medium (e.g., a bus, one or more electrical wires, trace, cable, etc.) or a wireless medium (e.g., air in combination with wireless signaling technology).

In some embodiments, point-to-point links may be CSI links through a CSI fabric 126. Processor 102 and processor 104 may be substantially identical and include memory controllers 110, 112 respectively which communicate with memories 106 and 108 respectively. Accordingly, the remaining discussion of this embodiment is conducted in the context of processor 102. However, this discussion applies equally to other destinations in the system, such as processor 104. Moreover, it is envisioned that some systems may have more or fewer destinations used by a source.

In addition to memory controller 110, processor 102 includes certain resources 116 and 118 which may be allocated to a particular source such as IOH 100. For purpose of this discussion, it is to be assumed that resource 116 and resource 118 are not shared, but are uniquely allocated to IOH 100. In some embodiments, e.g., resource 116 may represent the portion of a layer resource that is uniquely allocated to the source. Resource 116 and 118 may be, for example, buffers required for memory access or they may be some sort of execution component in the destination. Resource 116 and 118 may be further subdivided into segments (alternatively referred to as chunks) 172-1 through 172-4 and 174-1 through 174-4 respectively. Each segment is defined to be individually power manageable, such that the segment may have its powered turned on or off such that the power consumed by the resource may be varied with greater granularity.

The granularity at which power may be managed can significantly impact the efficiency and power saving of a source controlled dynamic power (SCDPM) scheme. In many cases, if the only option is having the resource completely on or completely off, it will negatively impact the possible benefit of the scheme. For example, if a resource is used to a small degree almost continually with large periodic bursts of activity, little or no power saving is possible if the only options are completely on or completely off. In some embodiments, it is not necessarily the case that all segments be the same size or have the same power consumption.

In the context of an execution component resource, the notion of segmentation may be more logical than physical. For example, the execution component may have a number of discrete power levels at which it can be operated resulting in a change in, e.g., quality of service, execution speed, etc. In this context, the segments are representations of the different possible power levels.

A dominate premise of SCDPM is that the source of resource usage is better positioned to know how much of the resource is likely to be needed than the destination that holds the resource. The IOH 100 is a particularly desirable to use in SCDPM due to the relatively high latency characteristics of IOH devices which allows more time from when requests are made to when data actually appears, the large amount of concurrent data streaming data (such as DMA) and a lack of an all purpose cache in the IOH.

Accordingly, an activity detector 150 within IOH 100 monitors the various other components of the IOH to predict likely future resource requirements. Based on that prediction, the activity detector uses its encoder 162 to create a power management command which may be sent to destination processor 102 by a CSI interface 140 over point-to-point link 124. In one embodiment, the encoder 162 encodes the PMC as a nonconfigurable write command eight bytes long including a destination identifier to specify the destination (e.g., processor 102), a resource identifier to specify the resource, e.g., resource 116 and an activity vector to specify the levels to which the resource should be powered up or down. Table One shows one possible encoding:

TABLE 1

Power Command for SCDPM Sent Over CSI

| RID | 0-3 | Resource Logic ID |
|---|---|---|
| DID | 4-7 | Destination Logic ID |
| Active bit vector | | A bit vector indicating which chunks are requested to be active |

As shown, in this embodiment, the destination ID is four bits long, the resource ID is four bits long and the activity vector is fifty-six bits long. The destination ID being four bits long permits up to 16 different destinations. Similarly, the resource ID being four bits long permits 16 different resources to be identified. In this embodiment, the Active Bit Vector may encode a ratio used to adjust the power-level of an arbitrary resource. With fifty-four bits, $2^{54}$ ratios are permitted. This is certainly enough to adjust any reasonable resource. It is also generic enough that one can use these bits to specify sub-fields that a decoder in the destination (discussed below) understands. As an example, setting the Active Bit vector to all 1's could mean to bring that resource to FULL POWER. All 0's could imply to completely POWER OFF the resource. In one embodiment, the decoder may interpret the fifty-four bits as a percentage fifty-four bits of accuracy which is also well beyond the granularity of any reasonable resource (in fact, it is sufficient to power-manage a single bit in main memory). It is believed that this command format provides sufficient granularity for substantially all cases of interest.

The command created is sent over link 124 to decoder 114 of processor 102. In one embodiment, decoder 102 recognizes the command as a non-configurable write and passes it to command decoder 120. Command decoder 120 parses the destination ID and resource ID fields to identify the resource to which the power management command is directed. The command decoder 120 also decodes the active bit vector and signals the power controller 122 what resource (116, 118) and which segments of the resource should be powered up or down.

In this manner, if a resource is likely to be unused or only partially used for a long enough period of time, significant power savings can be achieved. It should be recognized that what constitutes a long enough period of time may vary from one resource to the next. For example, there may be a power cost of transitioning between power states. In such case, the power savings from the lower power state should exceed the cost of the transitions. There may also be significant latency costs of the transition such that the possible power savings should be weighed again its cost in determining how much idle time is required for a reduced power state.

It is previously noted activity detector 162 monitors the components of the IOH 100. For example, activity detector 150 monitors requests or events coming from peripheral component interconnect (PCI) express port 132-0 through 132-N (collectively 132). Requests an event coming from PCI express ports 132 provide the activity detector an indication of likely future use based on the type of request or event and the destination identifier associated with that request or event PCI express ports 132 are connected to PCI express devices 130-0 through 130-N (collectively 130). PCI express devices may include hard discs or any other PCI device. As used herein "device" refers to any electrical component coupled to a link. A direct memory access (DMA) controller 170 is coupled to the IOH 100 to allow DMA transactions and supports legacy bridges and other peripheral devices. The DMA controls 170 sends interrupts to the IOH 100, activity detector may monitor these interrupts and similar to PCI request gains knowledge of expected future resource usage at destination coupled to the source.

Outgoing requests buffer 152 in IOH 100 is internal logic that tracks all transactions issued on the CSI bus. By monitoring the outgoing request buffer 152, the activity detector 150 can gain early knowledge of a future data stream where, for example, a destination is about to access IOH 100 to read or write a large amount of data. Write cache 154 contains data written from the various I/O devices waiting to go to main memory of a destination. During write back (WB) the requests are queued to send the data to the destinations. By monitoring the queue, activity detector 150 can estimate the traffic that will be caused in each destination by the pending write backs. The size of the write back queue and the rate of write back influences the time window over which activity detector 150 is able to predict usage from monitoring the write back queue.

Finally, the activity detector may monitor the credit pool 156. The credit pool 156 primarily gives an indication of current usage by the destinations. Current usage is not necessarily a good predictor of future usage, but the current usage may indicate inadequate power at one destination for the resources used. In that case, the activity detector may send an emergency power up message to that destination. While numerous components of the IOH 100 have been described as suitable for monitoring and providing hints to the activity detector of future usage it is within the scope and contemplation of embodiments of the invention that other components may also provide useful information of the activity detector to predict future resource usage.

Even in light of the large amount of information available to the activity detector, the activity detector should be designed such that the usage prediction is time accurate enough to minimize resource contention. For example, if the IOH 100 is preparing to write stream of data to a destination (e.g., processor 102) activity detector 150 needs to detect the request, make a decision and send a power up command to the destination in time for the destination to adjust the resource powering prior to arrival of the written data stream. Additionally, activity detector should avoid flooding the destination with power management messages as these consume bandwidth on the point-to-point link and may cause a latency increase in the destination logic as it performs the power adjustments.

Figure 2:
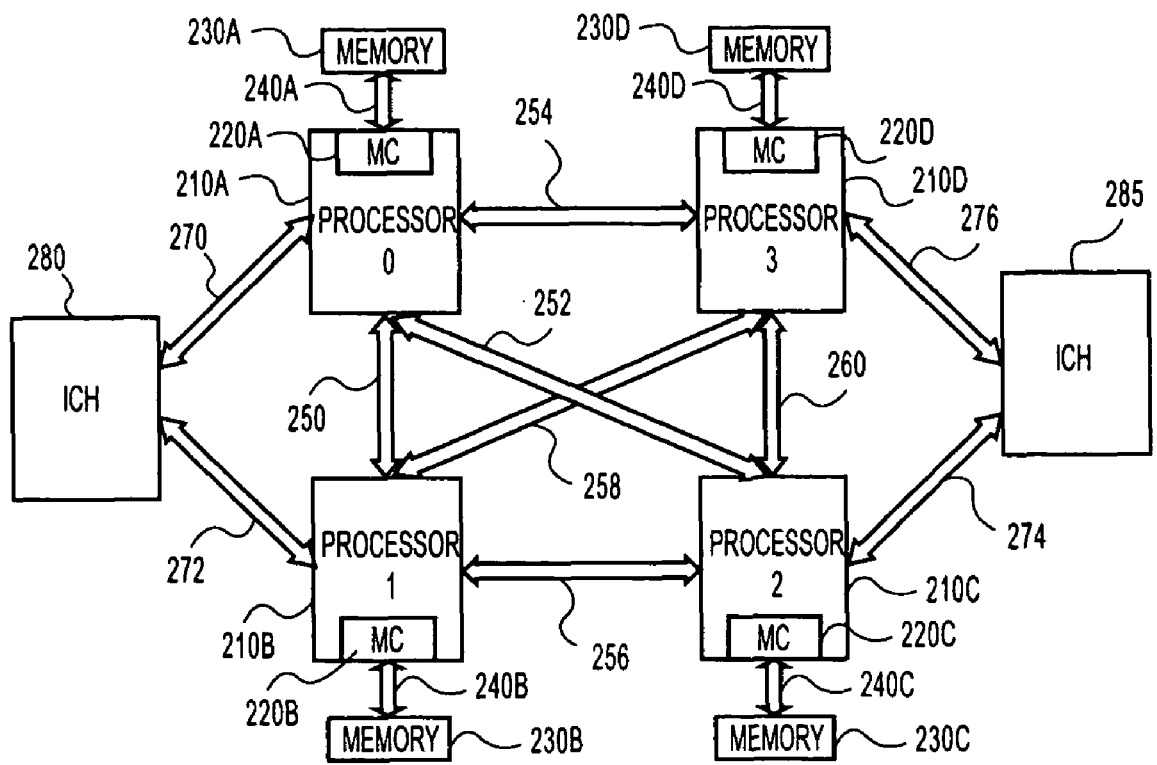
FIG. 2 is a block diagram of a multi-processor system of one embodiment of the invention.

Referring now to FIG. 2, an exemplary block diagram of a multiprocessor (MP) system 200 in accordance with one embodiment of the invention is shown. Similarly, MP system 200 may be a desktop or mobile computer, a server, a set-top box, personal digital assistant (PDA), alphanumeric pager, cellular telephone, or any other type of wired or wireless communication devices.

Herein, according to one embodiment of the invention, MP system 200 comprises a plurality of processors 210A-210D. One or more of processors, such as processors 210A-210D, may include a memory controller (MC) 220A-220D. These memory controllers 220A-220D enable direct communications with associated memories 230A-230D via links 240A-240D, respectively. In particular, as shown in FIG. 2, processor 210A is coupled to memory 230A via a link 240A while processors 210B-210D are coupled to corresponding memories 230B-230D via links 240B-240D, respectively. In one embodiment, the processors and IOH's are substantially identical to those described above with reference to FIG. 1.

Additionally, processor 210A is coupled to each of the other processors 210B-210D via point-to-point (e.g., CSI) links 250, 252 and 254. Similarly, processor 210B is coupled to processors 210A, 210C and 210D via CSI links 250, 256 and 258. Processor 210C is coupled to processors 210A, 210B and 210D via CSI links 252, 256 and 260. Processor 210D is coupled to processors 210A, 210B and 210C via CSI links 254, 258 and 260. Processors 210A and 210B are coupled via point-to-point links 270 and 272 to a first input/output hub (IOH) 280 while processors 210C and 210D are coupled via point-to-point links 274 and 276 to a second IOH 285. In instances where there is not a direct point-to-point connection, the intervening device, e.g., processor is provided with pass through logic to pass through commands from; e.g., IOH 280 to processors 210C and 210D. This allows IOH 280 to power manage a resource in those processors 210C and 210D that are dedicated to IOH 280.

Figure 3:
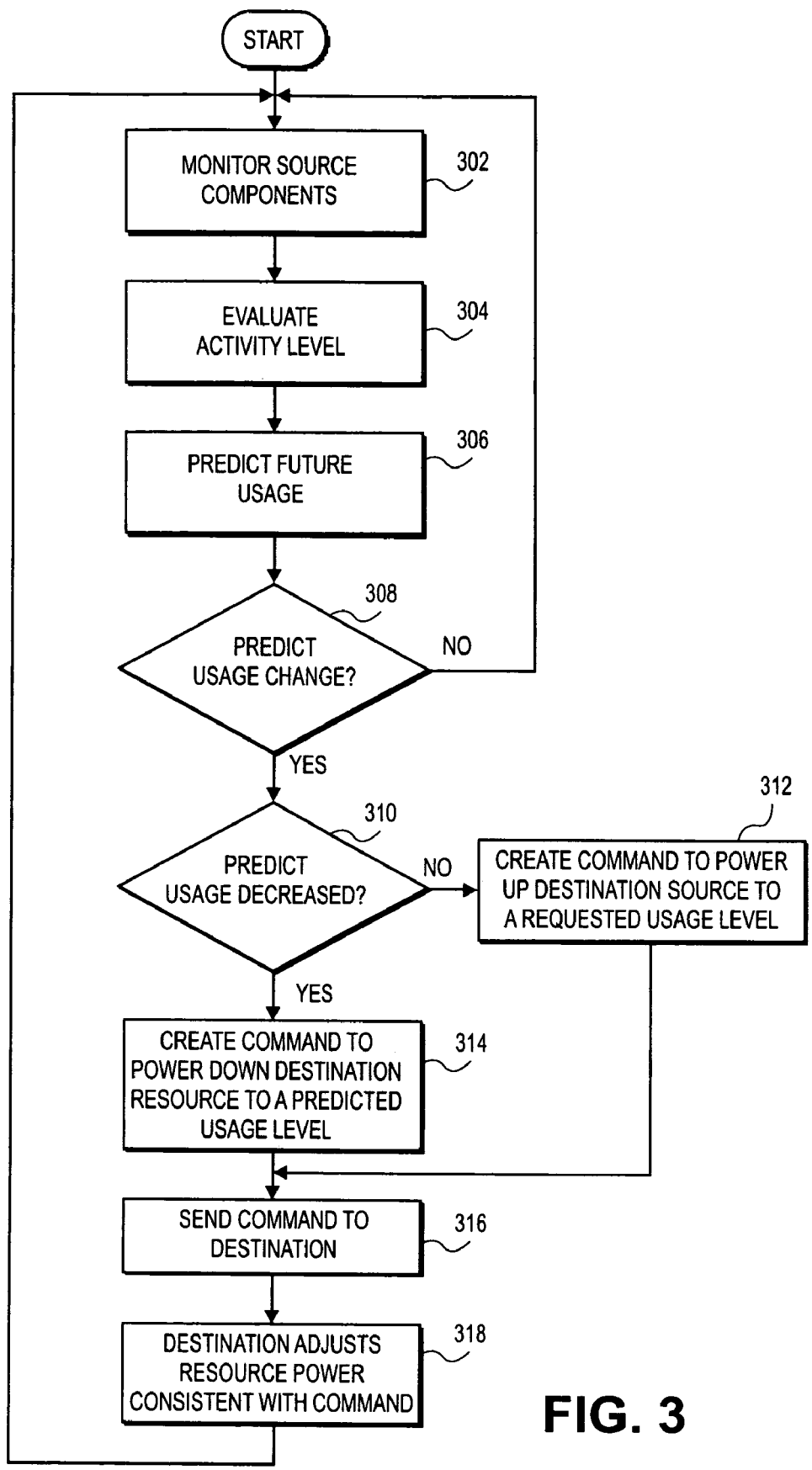
FIG. 3 is a flow diagram of operation according to one embodiment of the invention.

FIG. 3 is a flow diagram of operation according to one embodiment of the invention. At block 302, activity detector monitor source components at block 304 based on the monitoring of 302, the activity detector evaluates the activity level represented by the various source components. I/O, by nature, tend to be very bursty. This means that there is often a big disparity in resource usage between one time period and the next. As a result of the latency of I/O bursts between request and data arrival the IOH is well situated to predict future resource usage in a time effective manner such that latency caused by power transitions can be reduced. At block 306, the activity detector predicts future resource usage in a destination. At block 308 a determination is made if the prediction indicates a change in the usage will occur. For example, monitoring the outbound request queue may indicate that a large file has been requested to be read from main memory.

If no change in the usage will occur, monitoring continues at block 302. If a predicted change in the usage occurs, a determination is made at block 310 if the usage predicted a decrease. For example, the large file request mentioned above has been completed and no further file requests are present. In some embodiments, these determinations may be implicit. If the usage does not predict a decrease (or predicts an increase), activity detector creates demand power up the destination resource to a predicted usage level at block 312. If the usage is predicted to decrease at block 310, the activity detector creates a command to power down destination resource to a predicted usage level at block 314. At block 316, the command will either power up or power down the resource is sent to the destination. At block 318, the destination adjusts the resource power consistent with the command. Monitoring then continues at block 302.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. An apparatus comprising:
    a resource in a destination, some portion of the resource dedicated to a source;
    an activity detector in the source to determine an expected usage of the resource based on a plurality of types of requests and destination of requests received by the activity detector for a plurality of destinations including the destination, wherein the plurality of destinations are linked to the source by a plurality of point to point links, the activity detector to send a power management command to the destination over a point to point link coupling the source to the destination, the power management command to cause the destination to adjust the power consumption of the resource based on the expected usage.

2. The apparatus of claim 1 wherein the destination comprises:
    a decoder to decode the power management command; and
    a power controller to apply power to the resource responsive to the power management command.

3. The apparatus of claim 2 wherein the dedicated portion of the resource is logically organized into a plurality of independently power management segments.

4. The apparatus of claim 1 wherein the source comprises:
    an outgoing request queue;
    a writeback cache; and
    a credit pool, wherein the activity detector is coupled to the outgoing request queue to determine the unexpected usage based an amount of traffic in the outgoing request cue, wherein the activity detector is coupled to the writeback cache to determine the unexpected usage an amount of traffic in the writeback cache, and wherein the activity detector is coupled to the credit pool to determine the unexpected usage based on current usage in the credit pool.

5. The apparatus of claim 1 wherein the activity detection comprises:
    an encoder to encode a packet with a destination identifier, a resource identifier, and an activity vector.

6. The apparatus of claim 1 wherein the command comprises:
    a write command.

7. The apparatus of claim 1, wherein the incoming requests are received from a plurality of point to point links, wherein the activity detector comprises monitors to monitor the outgoing request queue, the writeback cache, and the credit pool, and wherein the activity detector minimizes resource contention amongst the resources based on information from the monitors.

8. A method comprising:
    evaluating activity in a source to determine an expected usage of a resource in a destination based on a plurality of types of requests and destination of requests received by the activity detector for a plurality of destinations including the destination, wherein the plurality of destinations are linked to the source by a plurality of point to point links;
    sending a power management command to the destination having the resource over a point to point link coupling the source to the destination; and
    powering a portion of the resource based on the power management command.

9. The method of claim 8 further comprising:
monitoring a plurality of components of the source to identify activity.

10. The method of claim 8 wherein evaluating comprises:
checking the contents of at least one of an outgoing request queue, a writeback cache, and a credit pool, wherein the activity detector is coupled to the outgoing request queue to determine the unexpected usage based an amount of traffic in the outgoing request cue, wherein the activity detector is coupled to the writeback cache to determine the unexpected usage an amount of traffic in the writeback cache, and wherein the activity detector is coupled to the credit pool to determine the unexpected usage based on current usage in the credit pool.

11. The method of claim 8 wherein sending a power management command comprises:
encoding a packet having a destination identifier, a resource identifier and a bit vector to specify a portion of a resource to be active; and
transmitting the packet over a point to point link to the destination.

12. The method of claim 8 further comprising:
decoding the power management command to identify a resource and an activity level for the resource.

13. The method of claim 8 further comprising:
predicting future usage of the resource based on the evaluation.

14. The method of claim 8, wherein the incoming requests are received from a plurality of point to point links, and further comprising:
monitoring the outgoing request queue, the writeback cache, and the credit pool; and
minimizes resource contention amongst the resources based on the monitoring.

15. A system comprising:
a server platform having a plurality of processors each processor having at least one resource;
an input/output hub (IOH) coupled to at least a subset of the processors of the plurality each by a point to point link, the IOH including an activity detector to send a power management command over a point to point link to at least one processor of the plurality based on a predicted future use of a resource based on a plurality of types of requests and destination of requests received by the activity detector for a plurality of destinations including the destination.

16. The system of claim 15 further comprising:
a peripheral component interconnect device coupled to the IOH.

17. The system of claim 15 wherein each processor comprises:
a power controller to respond to the power management command by changing a power state of the resource.

18. The system of claim 17 wherein the resource is dedicated to the IOH and wherein the resource is logically organized into separately power manageable segments.

19. The system of claim 15 wherein the activity detector is to monitor at least one of an outgoing request queue, a writeback cache, and a credit pool as at least a partial basis for the predicted future usage of the resource.

20. The system of claim 19, wherein the activity detector is coupled to the outgoing request queue to determine the unexpected usage based an amount of traffic in the outgoing request cue, wherein the activity detector is coupled to the writeback cache to determine the unexpected usage an amount of traffic in the writeback cache, and wherein the activity detector is coupled to the credit pool to determine the unexpected usage based on current usage in the credit pool.

21. The system of claim 15, wherein the incoming requests are received from a plurality of point to point links, wherein the activity detector comprises monitors to monitor the outgoing request queue, the writeback cache, and the credit pool, and wherein the activity detector minimizes resource contention amongst the resources based on information from the monitors.

* * * * *